United States Patent [19]
Vogel

[11] 3,928,841
[45] Dec. 23, 1975

[54] WELL LOGGING SYSTEM USING SINGLE CONDUCTOR CABLE

[75] Inventor: Charles B. Vogel, Houston, Tex.

[73] Assignee: Shell Oil Company, Houston, Tex.

[22] Filed: Oct. 3, 1974

[21] Appl. No.: 511,868

[52] U.S. Cl............................ 340/18 NC; 340/18 FM
[51] Int. Cl.² ............................................. G01V 1/40
[58] Field of Search ....... 340/18 NC, 18 CM, 18FM

[56] References Cited
UNITED STATES PATENTS

| | | | |
|---|---|---|---|
| 2,389,241 | 11/1945 | Silverman | 340/18 NC |
| 3,315,224 | 4/1967 | Ferguson | 340/18 NC |

*Primary Examiner*—T. H. Tubbesing
*Assistant Examiner*—H. A. Birmiel

[57] ABSTRACT

The present invention pertains to well logging and specifically to a system adapted for use with inexpensive cables consisting of a single conductor sheathed in a smooth insulating jacket.

4 Claims, 2 Drawing Figures

WELL LOGGING SYSTEM USING SINGLE CONDUCTOR CABLE

BACKGROUND OF THE INVENTION

Well logging systems generally utilize armored cables for suspending well logging instruments within a borehole to gather information about some physical entity measurable therein. These cables comprise one or more insulated conductors covered by a jacket formed of spirally wound steel wires. Although such cables are quite satisfactory in most cases, nevertheless, they are easily kinked if the diameter is less than about three-eighths inch. Moreover, use of these cables presents somewhat of a problem in the logging of producing wells, because the exterior surface of an armored cable is not smooth. The non-smooth surface makes it difficult to provide a seal when the cable is run through a stuffing box to prevent leakage of pressurized well fluids during logging operations. In addition, the manufacture of armored cables is inherently expensive, and expenditures for logging cables frequently represent a significant fraction of the cost of a logging operation.

BRIEF SUMMARY OF THE INVENTION

The present invention helps to overcome the above listed disadvantages associated with the use of armored well logging cables by providing a logging system which is adapted for use with a very simple type logging cable which is difficult to kink, has a smooth exterior and inexpensive. The cable consists of a single central conductive stress member sheathed in a smooth insulating jacket.

Two electrical paths are required to transmit information by electrical conduction from a downhole logging instrument to a surface indicator and these paths are provided in the system of the present invention by the conductive stress member and by conductive material within and surrounding the borehole being logged. This material includes earth formations penetrated by the borehole and fluids and pipe contained therein. Electrical coupling to this material is provided at the surface of the earth by a fixed electrode and within the borehole by a movable electrode which is attached to the downhole logging instrument.

Because the coupling provided by the movable electrode is of variable quality, information from the borehole instrument is transmitted to the surface in the form of a frequency modulated repetitive voltage fluctuation. At the surface of the earth the frequency of the voltage fluctuation is indicated and the indication provides information relating to the physical entity being investigated by the logging instrument. Where the downhole coupling to the earth is apt to be noisy, the movable electrode is insulated in such a way as not to come into direct contact with the borehole wall. In this case the downhole coupling to the earth is capacitive or is effected by electrolytic conduction or by a combination of the two kinds of couplings.

BRIEF DESCRIPTION OF THE DRAWINGS

The invention will more easily be understood from the following description of a preferred embodiment when taken with attached drawing in which.

DESCRIPTION OF A SPECIFIC EMBODIMENT

Figure 1:
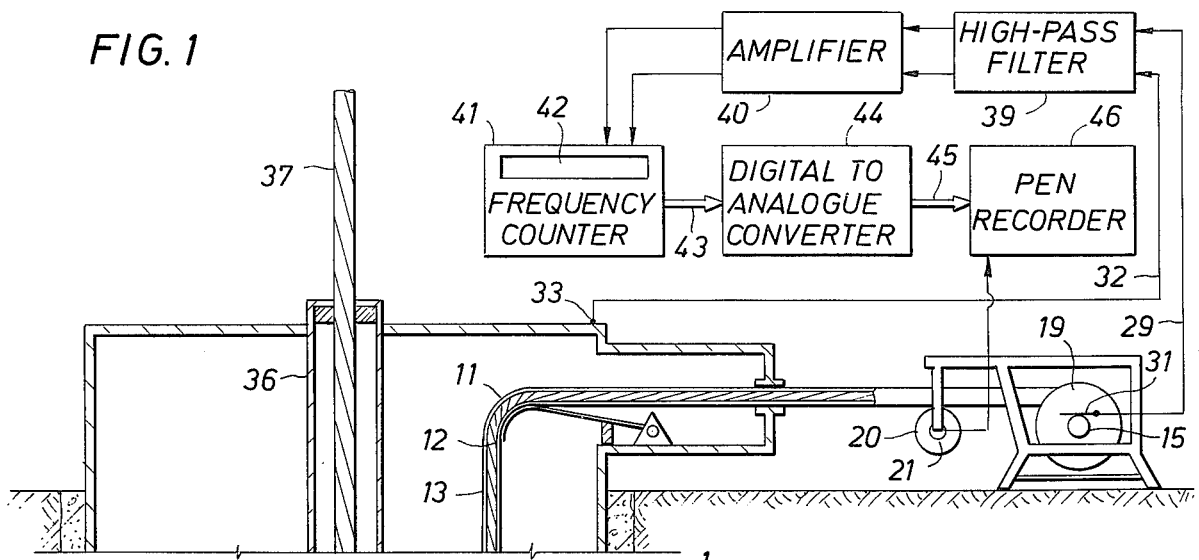
FIG. 1 is a diagrammatic view of the system of the present invention, including a cutaway cross section of a well containing a well logging instrument and logging cable.

Referring to FIG. 1, at 1 is shown a movable downhole logging instrument comprising two pressure tight housings 2 and a multiplicity of weight elements as at 3 and 4. The two housings and the weights may have a vertical length of 5 feet or more. The housings and weights are flexibly articulated by connecting links each made of a spirally wound steel inner support member 5 and a fluid tight outer compressible hose 6. The compressible hose 6 constructed of material possessing considerable longitudinal strength, such as nylon, whereas the support member 5 contributes radial strength to the link, so as to prevent the wires within the central channel from being crushed by pressure induced collapse of the link. The support member defines a central channel 7 which accommodates wires interconnecting parts of the instrument. The housings are made of metal and the various outer metallic portions of the instrument are maintained in electrical continuity by means of the support member 5 and by means of a cable link 7, by which the weight elements are suspended below the upper portions of the instrument. The outer metallic portions of the housings at 8 and 9 serve as a movable electrode which traverses the borehole as the logging tool is moved vertically therein for making measurements at various depths. The coupling between the electrodes and the well casing 35 or the earth is a resistive-capacitive coupling as explained below with reference to FIG. 2.

The instrument is suspended within the borehole by a well logging cable 11. The cable consists of a central conductive stress member 12 and a smooth insulating jacket 13 which is formed of nylon or other suitable plastic insulating material disposed.

The cable 11 is attached mechanically to the instrument within the borehole by a cylindrical metallic ferrule 14 which is permanently attached to the stress member 12 by swagging. The ferrule 14 is insulated from the body of the instrument by a cup shaped insulating bushing 15 which has a hole in its upper portion and by an insulating washer 16. The upper end of the cable passes over a hinged curved guide and through a stuffing box 18 and is attached at the surface of the earth to hoisting reel 19. The cable passes over measuring sheave 20 which is mechanically coupled to a synchro differential generator 21.

Electrical circuitry 22 and a pressure transducer 23 are disposed within an interconnected pressure tight cavity space 24 defined by the housings and by the hose-like connecting links therebetween. As explained in greater detail below, the transducer and the elements of the circuitry are so constructed and interconnected that sinusoidal voltage fluctuations are produced which have a frequency which is responsive to the magnitude of fluid pressure existing within the borehole at the depth to which the instrument is lowered. These repetitive fluctuations are coupled to the movable electrode as at 8 and 9 by means of conductor 25 and connection point 26 and to the conductive cable stress member 12 by the conductor 27 and connection point 28.

At the surface of the earth the conductive cable stress member 12 is connected to conductor 29 by means of slip ring 30 and brush 31 which are attached to the hoisting reel. A conductor 32 is connected at connection point 33 to the well head 34, which is attached to and thereby electrically connected to the well casing 35 and to the well tubing 36. In pumping wells there will also be present within the well tubing 36 sucker rod string 37 to which no separate connection is made.

For conditions normally encountered in oil wells, there will appear across conductors 29 and 32 a portion of the voltage fluctuation produced within the downhole instrument across conductors 25 and 27. This will be explained more fully below with reference to FIG. 2. The voltage across conductors 25 and 27 will be of the order of 1 volt and the portion of that voltage appearing across conductors 29 and 32 will be about 1 millivolt, provided that the ratio of the length of cable within the borehole to the length of the movable electrode does not exceed about 1000.

External insulators as at 38 are attached to portions of the exterior surfaces of the instrument, to prevent direct electrical contact between the metallic portions of the instruments and portions of the borehole wall or pipe contained within the borehole. In this way noisy connections are eliminated so that good measurements can be obtained while the tool is moving within the borehole. Electrical coupling between the ground side of the signal transmission paths and the movable ground electrode as at 8 and 9 is then effected by the capacitance and the resistance existing between the movable electrode and the material surrounding the instrument.

A frequency measuring subsystem is connected to conductors 29 and 32 and measures the frequency of the repetitive voltage fluctuations with a high degree of accuracy. The measuring system comprises a high pass filter 39, the input of which is connected to conductors 29 and 32. The filter is a Model 1952 Universal Filter manufactured by General Radio Company of Concord, Mass., and described in their 1973 catalog on page 91 and further described in the instruction manual supplied with the filter. This filter has a high input impedence of 100,000 ohms and presents a negligible load to the logging cable which has a shunt impedence of the order of 1000 ohms for a frequency of 3.2 KHZ, as produced by the downhole instrument, when a 5,000-foot length of the cable is suspended in a borehole. The filter is adjusted to have a gain of 1; to provide AC coupling; and to provide high pass filtering with low frequency cut off at 1,000 HZ. So adjusted, the filter attenuates frequencies below 250 HZ so that at the output the amplitude of these frequencies is no greater than 1/1000 of the amplitude at the input terminals. At the same time, attenuation for frequencies exceeding 2,000 HZ is negligible. In this way the filter rejects power line interference which may be introduced by corresponding ground currents at frequencies below 250 HZ. The output of filter 39 is connected to the input of amplifer 40. This amplier is a Model 2471A System Data Amplifier manufactured by Hewlett-Packard Company of Palo Alto, Calif., and described in their 1973 General Catalog on page 33 and further described in the instructional and descriptive material supplied with the device by the manufacturer.

The gain control switch of the amplifier is set in the X1,000 position and the bandwidth is adjusted 10 KHZ. So adjusted, the amplifier increases the amplitude of the output signal from the filter by a factor of 1,000 and generates output noise less than 5 mv. rms. The corresponding output signal attributable to the 1mv signal received from the downhole instrument (across the filter input) is about one volt.

The output of amplifier 40 is connected to the input of frequency counter 41. Counter 41 is a Model 5326A Multi-Function Counter manufactured by Hewlett-Packard and described in the above referenced printed catalogue on pages 264, 265 and 266 and further described in the printed instructional and descriptive material supplied with the device by the manufacture. The frequency counter indicates on a numeric read out 42 the frequency of the input signal once every second with an accuracy of about 1 part in 1500 provided the amplitude of the input signal exceeds about 150 millivolts peak. The frequency counter provides at output terminals thereon digital output signals for controlling recording devices.

The digital output signals from frequency counter 41 are connected by multiconductor cable 43 to the input of digital-to-analogue converter 44. Converter 44 is a Model 580A Digital-Up Analogue Converter manufactured by Hewlett-Packard and described on page 224 of the above-referenced catalogue and in the printed instructional and descriptive material provided with the device by the manufacturer. Converter 44 converts the digital output signals from counter 41 to an analogue output switch for recording by a pen recorder. The analogue output is provided at the output of the converter 44 in the form of a voltage which varies from zero to 100 mv for a 1,000 HZ change in the frequency indicated by the readout 42, the converter control knob being set to respond to the three least significant digits of the counter indication.

The output of converter 44 is connected by multiconductor cable 45 to the input of an analogue pen recorder 46 in which the paper drive is effected by a synchro differential motor. The motor in turn is connected to and controlled by the synchro differential generator 21 so that the movement of paper through the pen recorder 46 is proportional to the vertical travel of the logging instrument in the borehole during a logging operation. The pen recorder 46 is a Model 680, 5-inch Compact Recorder, manufactured by Hewlett-Packard and described on page 223 of the above-referenced catalogue and in instructional and descriptive material provided with the device by the manufacturer, except that the recorder is modified by having the paper drive motor supplied therein replaced by the above referenced synchro motor. The chart page supplied with the recorder has 50-scale lines evenly spaced across the narrow dimension of the paper and running in the direction of paper movement. Thus, the pen traces a curve for which the absaissa (running across the narrow dimension of the chart) is proportional to frequency change and for which the originate is proportional the distance traveled by the logging instrument in the borehole. The gear train which mechanically couples the synchro motor to the paper drive is changed to produce a depth scale along the chart ordinate of about one inch of chart length for each twenty feet of hole traversed by the instrument. Thus, the frequency measuring subsystem indicates the frequency of the repetitive wave form produced by the downhole instrument: the numeric readout of the counter; and, also on a plotted curve showing the variation of the frequency as a function of depth while the instrument is being moved vertically in the borehole.

Referring now to FIG. 1, the circuitry 22 comprises a bipolar transistor, a field effect transistor, resistors, capacitors and a battery 46 which are interconnected with the coil 47 of transducer 23 and with the capacitors 48 and 49 to form a Colpitts oscillator, and an output amplifier. The oscillator frequency is controlled and varied by the inductance of the transducer coil 47, which varies in response to fluid pressure changes, and by the capacitors 48 and 49. The capacitors each have a capacitance of 0.02 Fd and the coil 47 is wound with a sufficient number of furns of fine magnet wire so as to have an inductance of about 25 millihenries when the transducer is subjected to atmospheric pressure. Under these conditions the frequency of the oscillatory voltage produced by the downhole instrument will be about 302 Khz.

The transducer 23 comprises a soft iron pressure tight case 50; a thin magnetic diagram 51; a central soft iron coil core 52; the coil 47 above referenced; and lower end piece 53 containing a chamber 54 and connecting passage 55 which allows fluid from within the well to enter the chamber and transmit thereby the well pressure to diaphragm. The diaphragm is formed to the desired thickness by grinding material from the flat lowermost surface of the case 50. The thickness of the diaphragm and the gap between the core 52 and the diaphragm 51 are adjusted to provide the desired sensitivity. The diaphragm thickness is ground down to several thousands of an inch when low pressure wells are to be logged. When well pressure is applied to the diaphragm 51 it causes the gap between the diaphragm and the core to be reduced and thereby increases the inductance of the coil 47. This action in turn causes a reduction in the frequency of the oscillatory voltage produced by the instrument. As explained above, this frequency change is indicated at the surface by the pen recorder 46 and by the numeric indicator on the counter 41.

Figure 2:
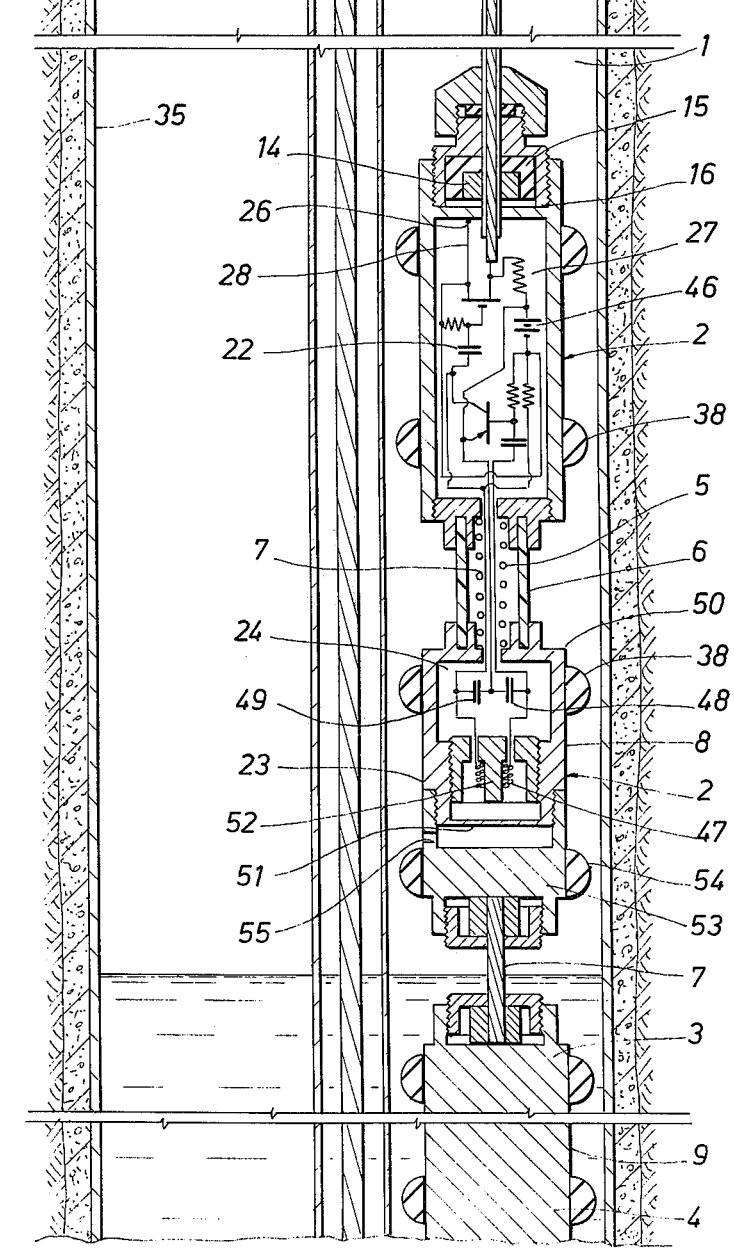
FIG. 2 is an equivalent circuit for the well logging system of FIG. 1.
Figure 2:
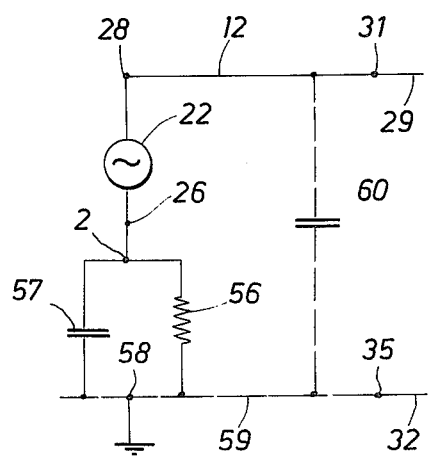

Referring now to FIG. 2, there is here shown an approximately equivalent circuit for the two electrical paths required to transmit information by electrical conduction from the downhole logging instrument to a surface indicator. The circuit 22 is shown as the equivalent of a generator which is capacitively and resistively coupled to the conductive material within and surrounding the borehole, and directly connected to the conductive cable stress member 12.

As shown in the figure, circuit 22 is coupled to the earth by the capacitance 56 and resistance 57 existing between the movable electrode as at 8 and 9 and surrounding material. The conductive material within and around the hole is shown as a virtual earth ground 58. A conductive path between the virtual ground within the borehole and the well head connection 33 at the surface is provided by the intervening earth material, well fluids and pipe. This path is shown as 59 in FIG. 2.

It will be seen that the above described logging system will indicate at the surface of the earth the fluid pressure existing at various known times and at various known depths within a borehole. This indication may be produced either while the logging instrument is stationary in the hole at a desired depth; or the indication may be produced and recorded while the logging instrument is slowly moved vertically in the borehole. by the obtained indications one can determine the rate of increase of pressure within the fluid filling the annulus of a pumping well and thereby measure the density of the fluid. By recording the pressure indications as a function of time at one depth, one can predict the probable rate at which a productive oil reservoir will lose its pressure and be depleted.

While the application of the present invention has been described with reference to a pumping well, it will be clear that it is applicable also to the logging of exploratory wells where there is no casing or tubing; for measuring fluid density and fluid level buildup. By substituting other types of transducers for the pressure transducer described above, it is possible to use the invention for logging resistivity, temperature and other physical entities measurable within a borehole.

The capacitance indicated at 60 in FIG. 2 is that which exists between the cable and the material which surrounds it in the borehole. This capacitance in general will not exceed about 10 pico-farads for each foot of cable suspended within the borehole. When the instrument is at a depth of 5,000 feet, for example, the shunt impedance attributable to this capacitance may become as small as 1,000 ohms. By contrast, the impedance presented by the capacitance 56 and the resistance 57 between the instrument and surrounding material, may be of the order of 100,000 ohms when the instrument and weights extend over a vertical distance of 5 feet. As a result of this high series impedance of 100,000 ohms between the movable ground electrode and the virtual ground 58, and as a result the low shunt impedance of 1,000 ohms between the cable conductor 12 and ground 58, there is an attenuation of the variable frequency signal of the instrument, such that it is reduced from an amplitude of the one volt at connection point 28 downhole to about 1 millivolt at the brush 31 on the surface. In the above discussion of the transmission of signals, the effect of cable resistance is neglected since it is negligible relative to the loss mechanism discussed, for the cable system and depth discussed. Similarly, the effects of shunt cable leakage and of other parameters omitted from the equivalent circuit are considered to be relatively insignificant for the conditions described.

I claim as my invention:

1. An electrical transmission system for a well logging tool comprising:

a well logging tool disposed to be lowered into a well and measure a physical parameter within the well, the value of said measurement being converted to an oscillating voltage whose frequency is related to said measurement;

at least one housing, said logging tool being disposed in said housing, said housing in addition having at least a portion of its outer surface formed of a metal;

a cable, said cable being formed of a central metallic stress member and a smooth outer insulating covering, said stress member in addition being coupled to said housing by an insulated coupling member;

two terminal means, one of said terminals being connected to said stress member and the other terminal being connected to the metal portion of said housing, said oscillating voltage being supplied to said two terminals; and amplifing means disposed at the surface of said well and coupled to the stress member and ground to detect said oscillating voltage, resulting from the capacitive coupling between said metal portion of said housing and ground.

2. The tramsmission system of claim 1 wherein said ground connection at the surface includes the well casing and production tubing.

3. The transmission system of claim 1 and in addition insulating means disposed on a part of the metal surface of the housing to prevent said housing from electrically shorting to ground in the well.

4. The transmission system of claim 1 wherein the frequency of the oscillating voltage is above 1,000 HZ.

* * * * *